United States Patent Office 3,451,954
Patented June 24, 1969

3,451,954
HYDROPHILIC POLYURETHANE FOAMS FROM QUATERNARY AMMONIUM SALTS OF N-DI-SUBSTITUTED AMINO ALCOHOLS
Joerg Sambeth and Alexis Archipoff, Carouge, Geneva, and Jean Pierre Godechot, Geneva, Switzerland, assignors to Elekal, Paris, France
No Drawing. Filed Nov. 28, 1966, Ser. No. 597,238
Claims priority, application Switzerland, Nov. 27, 1965, 16,353/65
Int. Cl. C08g 22/44, 22/16
U.S. Cl. 260—2.5
5 Claims

ABSTRACT OF THE DISCLOSURE

This specification discloses hydrophilic polyurethane foams. The foams are prepared by reacting a quarternary ammonium salt of an N-disubstituted amino alcohol with the ingredients conventionally used to prepare polyurethane foams.

---

This invention relates to hydrophilic polyurethane foams and a method of making same.

The hydrophilic polyurethane foams provided by the invention comprises the reaction product of at least one organic polyisocyanate, at least one polyester or polyether based polyol, water, and at least one quarternary ammonium salt of an N-disubstituted amino alcohol.

As is known, polyurethane foams consist of the reaction products of at least one organic polyisocyanate with at least one polyester or polyether based polyol and water.

Such polyurethane foams have, however, a distinctly hydrophobic nature thereby restricting, inter alia, their industrial or household use for sponging purposes, since they cannot by mere contact sponge a moist surface.

The foams provided by the present invention are highly hydrophilic in nature since they additionally comprise at least one quarternary ammonium salt of an N-disubstituted amino alcohol with said organic polyisocyanate. They thus comprise structural units of the formula:

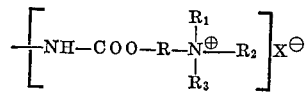

wherein $X^\ominus$ is an organic or inorganic acid anion and R, $R_1$, $R_2$ and $R_3$ are aliphatic, alicyclic, heterocyclic or aromatic residues, said structural units being attached to the polymer backbone itself.

The foams of the present invention are produced by direct synthesis, according to a method which comprises reacting at least one polyisocyanate, at ambient temperature and in the present of water, a catalyst and at least one surface active agent, with at least one polyester or polyether based polyol and at least one quarternary ammonium salt of an N-disubstituted amino alcohol.

The method thus consists in using for the synthesis of the foam, in addition to the conventional starting substances which are the polyisocyanates and the polyols, at least one quarternary ammonium salt of an N-disubstituted amino alcohol.

The function of this salt, which is a hydrophilic derivative, is to react with the polyisocyanate through its hydroxyl group, while its quarternary ammonium group remains free at the end of the chain; this group imparts to the foam its hydrophilic qualities.

As is known the said salts are of the general formula:

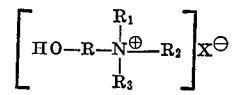

wherein $X^\ominus$ is an organic or inorganic acid anion and R, $R_1$, $R_2$ and $R_3$ are aliphatic, alicyclic, heterocyclic or aromatic residues.

The said quaternary ammonium salts can be obtained by the well-known art of quarternizing an aliphatic, alicyclic, heterocyclic or aromatic N-disubstituted amino-alcohol.

Thus, for instance, a series of suitable, choline type, quaternary ammonium salts can be obtained, in the form of trimethyl-hydroxy-ethylammonium salts, by quaternizing the aliphatic amino-alcohol, N-dimethylamino-ethanol. To this end, methyl iodide, chloride, carbonate or nitrite may be used by way of quaternizing agent. The salts thus obtained, i.e. choline chloride, iodide, carbonate, nitrate and nitrite, are well-suited for use in the method according to the invention. With choline chloride, for instance, it is possible to achieve excellent hydrophilic properties, using 1 part by weight thereof per 10 parts by weight of polyol.

Quaternary ammonium salts can also be produced from alicyclic amino-alcohols such as:

2-N-dimethylamino-cyclohexanol
4-N-dimethylamino-cyclohexanol
4-dimethylamino-cycloheptanol.

By way of quaternizing agents, methyl iodide or chloride can in this instance be used.

In the heterocyclic group of amino-alcohols, use may be made of:

5-N-dimethylamino-3-oxy-thionaphthene
6-N-dimethylamino-3-oxy-thionaphthene
3,6-bis-dimethylamino-9-oxy-xanthene
dimethylaminomethyl-[3,4-methylene-dioxy-ethyl]-carbinol
5-ethyl-2-[β-oxy-(2-dimethylaminophenyl-ethyl)]-pyridine
4-[5-dimethylamino-2-oxy-styryl]-pyridine.

By way of quaternizing agents, methyl iodide or chloride can also in this instance be used.

In the aromatic group of amino-alcohols, N-phenyl-N-N-methylethanolamine can be used. By way of quaternizing agents, methyl iodide, chloride, carbonate, nitrate or nitrite can be used.

With regard to the catalysts, use is preferably made of the same catalysts as are resorted to in the known methods of making polyurethane foams. The same applies to the surface active agents for stabilizing the foam. For this purpose, use can be made of silicone oils consisting of polyalkylene oxide polyorganosiloxane copolymers. Moreover, dimethyl-silicones can be used by way of macro-structural agents for imparting to the foams the appearance

Example 1

An intimate mixture of:

| | Parts |
|---|---|
| Polypropylene-glycol (M=2100) | 99 |
| Choline chloride | 1 |
| Total water | 3.5 |
| Toluylene-diisocyanate, TDI index 105. | |
| Silicone oil | 2 |
| Dimethyl silicone | 0.01 |
| Triethylene diamine | 0.3 |
| N-ethyl-morpholine | 0.3 |
| Stannous octoate | 0.3 | is prepared by stirring at ambient temperature and the mixture is then poured into a mold and left to foam.

The foam thus produced has outstanding hydrophilic properties which were ascertained by:

(1) A conventional method which consists in determining the wetting time of a sponge (2 to 3 seconds for a sponge of usual size);

(2) A conventional method which consists in measuring the wiping properties of a sponge. (The wiping efficiency reaches and exceeds 85%.)

Example 2

The procedure is the same as in Example 1, but instead of 1 part of choline chloride, 2 parts of choline iodide are used.

Example 3

The procedure is the same as in Example 1, but instead of 1 part of choline chloride, 5 parts of choline iodide are used.

Example 4

The procedure is the same as in Example 1, but instead of 1 part of choline chloride, 5 parts of choline carbonate are used.

Example 5

The procedure is the same as in Example 1, but instead of 1 part of choline chloride, 3 parts of N-phenyl-N,N-dimethylethanol amine iodide.

We claim:

1. A hydrophilic polyurethane foam prepared by reacting (i) at least one organic polyisocyanate, (ii) at least one polyol selected from the group consisting of polyethers and polyesters, (iii) water, and (iv) a salt having the general formula:

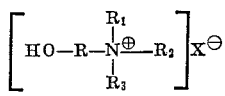

wherein X is an organic acid anion or an inorganic acid anion and R, $R_1$, $R_2$ and $R_3$ are aliphatic, alicyclic, heterocyclic or aromatic residues.

2. The hydrophilic polyurethane foam of claim 1 wherein said salt is selected from the group consisting of choline chloride, choline iodide, choline carbonate and N-phenyl-N,N-dimethylethanol amine iodide.

3. The hydrophilic polyurethane foam of claim 1 wherein said organic polyisocyanate is toluylene diisocyanate.

4. The hydrophilic polyurethane foam of claim 1 wherein said polyether is a polypropylene glycol having a molecular weight of about 2100.

5. The hydrophilic polyurethane foam of claim 1 wherein X is a halide.

References Cited

FOREIGN PATENTS

| | | |
|---|---|---|
| 411,336 | 11/1966 | Switzerland. |
| 417,084 | 1/1967 | Switzerland. |
| 924,081 | 4/1963 | Great Britain. |
| 1,043,509 | 9/1966 | Great Britain. |
| 1,210,555 | 2/1966 | Germany. |
| 1,399,243 | 4/1965 | France. |

DONALD E. CZAJA, *Primary Examiner.*

MICHAEL B. FEIN, *Assistant Examiner.*